United States Patent [19]
Hill et al.

[11] Patent Number: 5,319,472
[45] Date of Patent: Jun. 7, 1994

[54] MULTISPECTRAL COLOR IMAGE PICKUP SYSTEM

[75] Inventors: Bernhard Hill, Aachen; Friedrich W. Vorhagen, Stolberg, both of Fed. Rep. of Germany

[73] Assignee: Linotype-Hell AG, Fed. Rep. of Germany

[21] Appl. No.: 972,412

[22] Filed: Nov. 5, 1992

[51] Int. Cl.$^5$ .................................. H04N 1/46
[52] U.S. Cl. ........................ 358/500; 358/512; 358/529
[58] Field of Search ............... 358/75, 80, 447, 448, 358/443, 500, 512, 529; 355/32

[56] References Cited

U.S. PATENT DOCUMENTS

| | | | |
|---|---|---|---|
| 4,249,807 | 2/1981 | Webster | 354/4 |
| 4,679,073 | 7/1987 | Hayashi | 358/80 |
| 4,731,661 | 3/1989 | Nagano | 358/75 |
| 4,965,663 | 10/1990 | Sasaki | 358/80 |

FOREIGN PATENT DOCUMENTS

3539540A1  5/1986  Fed. Rep. of Germany ......... H04N 1/46

OTHER PUBLICATIONS

Farbenlehre und Farbenmessung, Werner Schultze, pp. 34-43.
Journal of the Optical Society of America, vol. 55, No. 4, Apr., 1965 "Digital System for Converting Spectrophotometric Data to CIE Coordinates, Dominant Wavelength, and Excitation Purity", J. E. McCarley et al., pp. 355-360.
Journal of the Optical Society of America, vol. 50, No. 2, Feb., 1960, "Use of a Digital Readout Unit in Converting Spectrophotometric Data to Color Coordinates", Fred W. Billmeyer, Jr. pp. 137-143.

Primary Examiner—Mark R. Powell
Assistant Examiner—Jerome Grant, II
Attorney, Agent, or Firm—Hill, Steadman & Simpson

[57] ABSTRACT

A method and apparatus for color stimulus specification-correction, i.e. sensation-correction pickup for scanning of chromatic image originals, referred to in short as a multispectral scanner. A color image pickup system is provided, based on the multispectral principle, the plurality of I>>3 narrow-band spectral filters and one black filter being introduced into the optical beam path of the image scanner, and thus I narrow-band spectral separations of a color image original and of a white image original are registered and digitized. Spectral pixel samples individually calibrated for all pixels are formed with an electronic evaluation unit in pickup real time. These are either stored in I parallel image storage levels or are multiplied by specific coefficients from a table in pickup real time of the signals in three parallel channels and are accumulated in three parallel image storage levels.

13 Claims, 13 Drawing Sheets

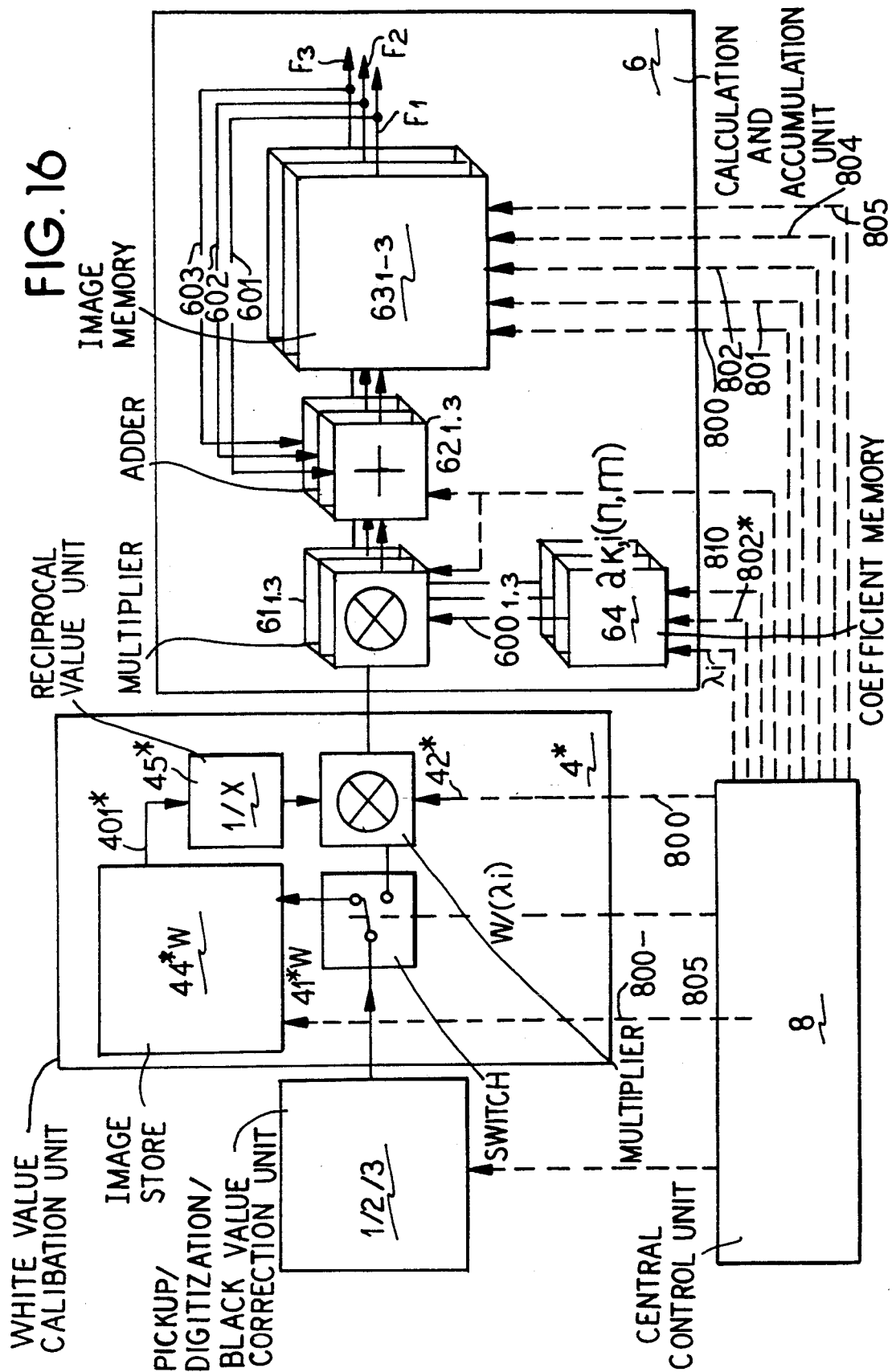

MULTISPECTRAL COLOR IMAGE PICKUP SYSTEM

BACKGROUND OF THE INVENTION

The invention is directed to a method for the correct, i.e. visually correct, identification of the color information of colored scenes or image originals—referred to below as "color analysis" which derives color value signals pixel-by-pixel according to the multispectral method. The signals acquired according to this method should thereby be of such a nature, in conformity with the definition, that they describe the informational content "color" of an image for a person having normal achromatic vision such that color image reproduction systems can be driven directly or indirectly, for example after suitable conversion, with the assistance of these signals. These color image reproduction systems then reproduce the images such that a normal observer cannot distinguish them from the original.

The problems involved as well as the current state of the art in this field are presented in detail in Letters Patent DE 28 44 158 C3 "Verfahren zur Reproduktion von Originalvorlagen welche bezueglich ihres Farbgehaltes nach einem". The problems of current color image scanning systems deriving from the prior art shall be set forth first below. Subsequently, the properties and advantages of the multispectral method of the invention shall be set forth, compared to the three-region method previously exclusively employed in color analysis.

The laws of colorimetry supply the theoretical foundations for the proper, chromatically correct reproduction of image originals. These make it possible to unambiguously describe color perceptions with the assistance of only three values, even though the actual physical cause of the color as a sensory experience is electromagnetic radiation in the visible range of the spectrum from 380 through 780 nm. The reason for this enormous data reduction occurring in the visual perception process is the structure and the functioning of the human eye, as well as the subsequent processing of the primary information in the brain. This process is formulated in the simplest and clearest way by the fundamental colorimetric law, M. Richter, Einfuehrung in die Farbmetrik, 2nd Edition, Berlin, N.Y., de Gruyter, 1980, in accordance with which the eye linearly and steadily evaluates the incident radiation according to three mutually independent, spectral performance functions, whereby the individual effects added up to form an inseparable overall effect—the color sensation. The biological condition for this is that three types of light-sensitive sensory cells having different spectral sensitivities exist in the human eye. These three so-called fundamental spectral value curves are shown in FIG. 1.

The nature of the integral information processing with three different, spectral performance functions, however, results therein that a theoretically infinite plurality of different spectral color stimuli can trigger the same color sensations. Colors having the same appearance despite a differing spectral composition are referred to as metamerically or conditionally identical. A technical reproduction system which wishes to chromatically reproduce the color originals true to the original must, just like the human eye, consequently be able to recognize metameric colors as the same. On the other hand, it cannot distinguish specific colors from one another which the human eye recognizes as different. It thus "sees" certain colors more or less incorrectly and can then likewise no longer correctly reproduce them in the color synthesis. An exact correction of the electrical signals is not possible. A subsequent correction is possible only in certain exceptional instances. This means that color reproduction systems must have their design features based both on the biological givens of the human eye as well as on the further processing of the primary information in the brain. In terms of information theory, these are sync-oriented systems. Reproduction systems therefore fundamentally resolve into color analysis, signal processing, and color synthesis in accordance with FIG. 2. The color analysis under consideration here is comparable to color measurement. According to DIN 5033 there are three possibilities for color measurement:

1. the equality method
2. the three-range method
3. the spectral method.

The equality method is a purely subjective measurement method wherein the observer compares unknown colors to a collection of known colors, for example in a color atlas, and visually identifies them. This is not suitable for color analysis in color image reproduction.

The state of the art in color image processing is the three-range method. In technical systems, work is carried out exclusively according to this method. Analogous to the receptor rods in the eye, optoelectronic transducers are employed as light-sensitive sensors, these optoelectronic transducers converting the incident radiant power in the visible range of the spectrum into electrical signals. Dependent on the embodiment and arrangement of the sensors, one distinguishes:

a) picture element sensors that only cover the information of one picture element, for example photocells, photomultipliers and photodiodes. In order to acquire the entire information, for example, the luminescent spot of a cathode ray tube having an extremely short persistence time is conducted in raster-like fashion across the image with a suitable optics. The signal at the output of the photomultiplier is a measure for the remissivity or transmissivity of the picture element that has just been illuminated. Apparatus working according to this principle are employed in television technology for scanning moving picture films and diapositives (FIG. 3—flying spot scanner). In other apparatus having sensors of this type, for example, the image to be scanned is moved in raster-like fashion in a stationary light beam. Typical apparatus are drum scanners which are employed with preference in reprographics. The image to be scanned is clamped on a rotating drum and the optoelectronic system composed of light source, imaging system, and sensor is translationally conducted past the drum, so that the image is scanned in the form of a helical line (FIG. 4, drum scanner).

b) Sensors arranged in line-like fashion, what are referred to as CCD lines, are composed of a plurality of individual photodiodes (for example, 512, 1024, 2048 or 4096 photodiodes). The picture element informations of an entire image line are adjacent and parallel to one another, and are converted into sequential data streams. The image to be scanned must be moved perpendicular to the line direction. Typical apparatus that employ this sensor arrangement are flat bed scanners, as is known from the Desktop Publishing field (FIG. 5—flat bed scanner).

c) Planarly arranged sensors are, for example, the individual, mosaic-shaped elements of the storage target (light-sensitive semiconductor photolayer) in conventional video pick-up tubes or, on the other hand, the discrete photodiodes in modern CCD arrays arranged in groups of 512×512, 1024×1024, 2048×2048 or 4096×4096. They simultaneously acquire the entire image information and convert it into chronologically continuous image signals on the basis of suitable, electronic measures. In terms of structure, the planarly arranged sensors are most similar to the retina of the eye; their great advantage is comprised therein that no mechanical motions are now required for scanning an image.

Analogous to the structure of the retina, three types of light-sensitive sensors having three different spectral sensitivities are required in the three-range method as well, these being realized in technical apparatus in that either three different, optical correction filters are inserted in front of a sensor in rapid succession or, on the other hand, in that the optical beam path is split into three channels by beam splitters such that three sensors each having respectively one correction filter are present. There are also flat bed scanners without correction filters having only one CCD line, whereby the individual image lines are successively illuminated with a light source emitting in the red, green and blue spectral range (FIG. 5). So that technical reproduction system can then correctly implement the color analysis according to the three-range method, the effective spectral channel sensitivities must coincide with the three spectral sensitivities of the cone of the human eye according to FIG. 1 in a suitable way. As a result of the linear and steady color stimulus or trichromatic matrix (fundamental colorimetric wall), an exact color analysis can be implemented with all spectral sensitivity curves that can be linked via a linear transformation with the fundamental spectral value curves. It is thus not required and not even expedient for fabrication-oriented reasons and reasons of the signal-to-noise ratio to strive for a direct simulation of the fundamental spectral value curves since, in particular the p(λ) and the d(λ) curves lie extremely close to one another and thus have no good color separation properties. Even slight errors of the spectral sensitivity of the channel would lead to unbearably great errors in the color value signals, just as would signal noise or quantization errors.

According to the theory of additive color mixing, the spectral value curves or color mixing curves belonging to the referenced stimuli for real primary color, for example red, green and blue, can be identified for these real primary colors. These spectral value and color mixing curves in turn have to be a linear combination of the fundamental spectral value curves. FIG. 6 shows the spectral value curves r(λ), g(λ) and b(λ) that are based on the spectral primary colors R=700 nm, G=546.1 nm and B=435.8 nm defined by the CIE (Commission International de l'Eclairage) in 1931. The CIE spectral value curves are linked with the fundamental spectral value curves (the spectral sensitivities of the three types of cone in the eye) by the following, linear equation system:

$$\begin{bmatrix} r(\lambda) \\ g(\lambda) \\ b(\lambda) \end{bmatrix} = \begin{bmatrix} 1,0775 & -0,9098 & 0,0093 \\ -0,0170 & 0,1983 & -0,0044 \\ 0,0001 & -0,0020 & 0,1788 \end{bmatrix} \cdot \begin{bmatrix} p(\lambda) \\ d(\lambda) \\ t(\lambda) \end{bmatrix}$$

FIG. 7 shows the spectral value curves of color television. They refer to the receiver primary colors $R_e$, $G_e$ and $B_e$ of the picture screen luminescent phosphors defined by the EBU (European Broadcasting Union). They, too, are linearly linked to the fundamental spectral value curves.

Color mixing curves for real primary colors corresponding to FIGS. 6 and 7 have significantly more beneficial color separation properties than the fundamental spectral curves according to FIG. 1. Dependent on the selection of the referenced stimuli, however, they comprise more or less great, negative components of the spectral sensitivity that cannot be technically realized in this way with sensors. In apparatus, one attempts to simulate spectral value curves whose maximums respectively lie in the red, green and blue spectral range—similar to the curves in FIGS. 6 and 7. However, the required, negative spectral sensitivities are left out of consideration. Consequently, no color reproduction system has spectral value or color mixing curves that exactly coincide with the linear combination of the cone sensitivities of the eye.

The spectral sensitivity curves of various apparatus also differ greatly. Even apparatus of the same type can have channel sensitivities that depart greatly from one another. No current, technical apparatus is thus in the position to implement and exact color analysis according to the three-range method. Color images that are reproduced with various systems thus end up different with respect to their color reproduction, even on the very basis of the different color analysis. Electronic manipulations performed at the color value signals can in fact lead to an improvement of the color analysis, when, for example metameric problems can be precluded when scanning originals that have already been reproduced. Since reproductions—diapositives, reflected light images or even color prints—are continuously constructed from three colorant constituents known in terms of their spectral composition according to what are as a rule known as mixing laws, exactly one spectral transmissivity or remissivity exists for each triad of color densities or colorant concentrations. Given knowledge of the spectral sensitivities of a scanner, an unambiguous although non-linear relationship between the colorant concentrations in the original and the color value signals at the output of the scanner can be recited. Given a known type of original and known scanner, an unambiguous and reversible relationship between the color values in the original and the color values derived therefrom with this one scanner exists by the calculatable spectral transmissivity or remissivity. An exact allocation between scan values on the one hand and exact color values on the other hand is thus possible via a three dimensional table. Given different combinations composed of the type of original and scanner, however, different relationships apply, and thus different function tables apply. In practice, however, one is limited to simple manipulations such as non-linear pre-distortions and linear metricizing of these scanned signals in order to achieve an improvement. Exact allocations between scan values and color values, however, cannot be achieved in this way. The required apparatus adjustments (non-linear characteristics and matrix coefficients) can in fact be computationally optimized. In practice, however, the method cannot be implemented since the spectral properties of the image originals are usually unknown to the user. One is merely limited to a correct balancinc of the gray or achromatic axis in order to obtain a harmonic image impression. F. W. Vorhagen, Ueber die farbvalenzmetrische Optimierung der Fabwiedergabeeigenschaften elektronischer Reproduktionssysteme, Dissertation, RWTH-Aauchen, 1978.

Given such a correction, of course, all components of the color image scanning system dependent on the wavelength must also be computationally taken into consideration, such as, for example, the spectral distribution of the illuminating light source as well as the spectral transmission of the optics and the spectral and locus-dependent sensitivity distribution of the image sensor.

FIG. 8 shows some technically realized, spectral sensitivity curves of video film scanners made by various manufacturers. All curves exhibit substantial differences compared to the rated curves of FIG. 7. As FIG. 9 shows, even the spectral sensitivities of drum scanners made by one manufacturer are likewise not uniform compared to one another. FIG. 10 shows the spectral channel sensitivities of a flat bed scanner from the Desktop Publishing area. This scanner achieves the color separation with three luminescent lamps in the red, green and blue range that light in chronological succession. The line spectra of the lamps can be clearly seen.

The color value signals and the reproductions that, for example, can be produced with the various apparatus from the same image original are just as different as the spectral sensitivity curves of the scanners shown here. The three-range method is thus not suitable for an exact color analysis in reproduction systems. The fact that it is nonetheless currently exclusively employed in technical systems is because it can be realized relatively simply and cost-beneficially. Moreover, all color reproduction systems currently in existence are constructed as what are referred to as "closed systems", wherein color analysis and color synthesis occur in the same apparatus, so that method-associated errors of the color analysis can be partially corrected by manipulations in the color synthesis. The data produced with one apparatus, however, are fundamentally not suited for color synthesis on another apparatus. An "open structure" as will be required in the future in data networks presumes an exactly defined reference interface as a connection between color analysis and color synthesis so that every scanner can produce color-binding linked with any reproduction system. In summary, it can thus be stated that the known color image pickup systems implement the color analysis according to the three-range method in only an imprecise fashion and require exact knowledge about the physical properties of the image original and of the scanner for correcting the electrical signals, this knowledge being usually only available to a person skilled in the art. In future electronic color image systems, however, a color image scanning system must be capable of being operated without knowledge of the inner physical relationships; otherwise, it could not be employed in a network or even in the private domain.

SUMMARY OF THE INVENTION

It is an object of the invention to specify a color image scanning system that

1. Implements an exact color analysis independently of the knowledge of the physical properties of the color image original;
2. Can be employed on various light sources having broadband radiation distributed over the visible spectral range for illuminating the originals to be scanned, without knowing the exact curve of the spectral distributions;
3. Corrects all errors
   a) due to non-uniform illumination over the surface of the image to be scanned,
   b) due to an unknown spectral distribution of the illuminating light source,
   c) due to spectral-dependent sensitivities of the sensor elements,
   d) due to spectral-dependent and imaging-dependent transmission properties of the optical components in the beam path automatically and in interrelationship on the basis of a simple calibration event; and
4. Allows any desired conversion of the detected color value signals onto various standard light sources that are recommended as reference light sources in the reproduction of the scanned color image and which
5. Enables an improved signal-to-noise ratio of the registered image data.

This object is achieved in that the color image scanning system of the invention utilizes the multispectral method and sequentially picks up a greater but finite number of, for example, $I>3$ narrow-band color separations distributed over the entire, visible spectrum. The color separations are deposited in I spectral separation memories and, for calibration before the beginning of a measurement, form black correction values with a black original, subtracts these values from the signals of the spectral separations when reading into the spectral separation memory in real time and, before the beginning or at the end of a color image pickup, forms multiplicative correction values with a white original and multiplies every signal of a spectral channel with this in real time and automatically on the basis of appropriate electronic circuits.

An additional development of the invention is that the spectral signals that are sequentially registered are weighted with coefficients in real time in a further electronic circuit when picked up or read out from the I spectral image memories, said coefficients being taken from a programmable table having a plurality of selectable memory levels, an exact conversion onto specific standard light sources being thereby implemented.

In a further development of the invention, the correction values from the calibration event with a white original are deposited at the beginning of the color image pickup into the I spectral value memories under their respective pixel address and are in turn read out in real time from the spectral value image memories in the sequential pickup or registration of the color pixel signals, are multiplied as reciprocal values with the registered color pixel signals, and are subsequently again stored in the same spectral image memories under the same address. This does not lead to an increased added expense for a memory location for the calibration event with the white original.

In a further development of the invention, the I sequentially formed spectral signals of each and every pixel are sequentially weighted with specific coefficients from a table in an electronic circuit having three parallel channels during the pickup and are accumulated in three parallel image stores in a specific way and three independent color value signals are formed therefrom.

The stated object of the invention, to identify colors in color image reproduction systems as exactly as possible in terms of a color stimulus specification, can only be realized on the basis of the spectral method. It is the most precise of the color-measuring methods and is currently employed only in the technical scientific field for the identification of individual colors. The spectral transmissivities or remissivities $t(\lambda)$ or respectively $\beta(\lambda)$ of the color specimens are calculated in a spectral photometer at intervals of 1 nm or 5 nm in the visible range of the spectrum from 380 nm through 780 nm, and the color values are calculated upon employment of spectral value curves that are exact in terms of color stimulus specification, these spectral value curves being present in tabular form with high precision. The precision of the measurement is thereby only dependent on the bandwidth of the monochromator and on the sensitivity of the detector. For identifying the color values (the tri-stimulus values of the light), one refers to the XYZ valence system defined according to DIN 5033. The corresponding standard spectral value curves $x(\lambda)$, $y(\lambda)$ and $z(\lambda)$ have no negative parts, so that all existing colors are described by exclusively positive color values. The reference stimuli of the system are defined such that the standard color value Y characterizes the luminescence and the standard color values X and Z characterize the chrominance of a color. FIG. 11 shows the standard spectral value curves according to DIN 5033.

Taking the radiant distribution $S(\lambda)$ of the illuminating light source into consideration, the standard color values of a reflected light or transmitted light original are calculated as $$X = k \int_{380 \text{ nm}}^{780 \text{ nm}} S\lambda \cdot \beta(\lambda) \cdot x(\lambda) d\lambda$$

$$Y = k \int_{380 \text{ nm}}^{780 \text{ nm}} S\lambda \cdot \beta(\lambda) \cdot y(\lambda) d\lambda$$

$$Z = k \int_{380 \text{ nm}}^{780 \text{ nm}} S\lambda \cdot \beta(\lambda) \cdot z(\lambda) d\lambda$$

$$\text{with } k = \frac{100}{\int_{380 \text{ nm}}^{780 \text{ nm}} S\lambda \cdot y(\lambda) d\lambda}$$

The norming factor k is arbitrarily defined such that the standard color value Y becomes Y=100 for ideal white $\beta(\lambda)=1$, or $\tau(\lambda)=1$, taking the illuminating light source into consideration.

Further substantial advantages of the spectral method are comprised therein that any desired reference or reproduction light sources can be taken into consideration in the numerical calculation of the color values, and that one can refer to any desired reference stimulus systems when defining the spectral value curves. Negative parts of the spectral value curves can be taken into consideration in computationally correct fashion.

Spectral photometers having filter monochromators with a finite bandwidth (5 nm through 10 nm) are utilized in technical applications, for example in quality control or in manufacture. These apparatus then no longer work according to the physically exact spectral method, but according to what is referred to as the multispectral method. With disappearing filter bandwidths on the one hand, this method merges into the spectral method. Given a minimum of three filters on the other hand, it merges into the three range method. Given filter monochromators having only 16 channels, a 20 nm filter spacing and a 10 nm half transmission width, however, a significantly more exact identification of the color values of individual colors is possible in comparison, for example, to the three range method, since the spectra of the colors occurring in nature proceed relatively homogeneously and do not have any extreme discontinuities. Analogous to electrotechnical signal processing, these "scanned" spectra of natural colors are band-limited, so that, observing the sampling theorem, they can be in turn nearly exactly reconstructed, having been sampled with finite channel bandwidths. In the calculation of the standard color values, the integral notation converts into the summation notation, whereby the coefficients x(i), y(i) and z(i) of the standard spectral value curves must be correspondingly matched to the filter bandwidths employed. When one has reference to a minimum half transmission width of 10 nm given a band gap of 20 nm in, for example, color analysis according to the multispectral method, then I=16 channels are required for covering the visible range of the spectrum. The color values X, Y and Z are then calculated as the sum of the spectral transmissivities or remissivities $\tau(i)$ or $\beta(i)$, weighted with the coefficients x(i), y(i) and z(i) belonging to every channel and multiplied by the spectral radiation distribution of the illuminating light source S(i), and calculated as $$X = k_x \cdot \sum_{i=1}^{16} \beta(i) \cdot S(i) \cdot x(i)$$

$$Y = k_y \cdot \sum_{i=1}^{16} \beta(i) \cdot S(i) \cdot y(i)$$

$$Z = k_z \cdot \sum_{i=1}^{16} \beta(i) \cdot S(i) \cdot z(i)$$

$$\text{with } k_x = \frac{X_{BL}}{\sum_{i=1}^{16} S(i) \cdot x(i)}$$

$$k_y = \frac{Y_{BL}}{\sum_{i=1}^{16} S(i) \cdot y(i)}$$

$$k_z = \frac{Z_{BL}}{\sum_{i=1}^{16} S(i) \cdot z(i)}$$

$X_{BL}$, $Y_{BL}$ and $Z_{BL}$ are the standard color values of the illuminating reference light source.

Although the spectral method or the multispectral method is the most exact color measuring method, its employment for color analysis in color image reproduction is unknown. Compared to the three range method, the technological expense for realizing a color image scanner according to the multispectral method is only insignificantly greater—although, for example, 16 optical and electronic channels are required instead of three. On the other hand, the multispectral method of the invention offers the following, critical advantages:

1. A nearly ideal, metamerically independent color analysis can only be implemented with the multispectral method;

2. Knowledge of the physical properties of the color image original is not required;

3. Arbitrary reference light sources can be taken into consideration in calculating the color values, or arbitrary reference systems can be realized by selecting appropriate sets of coefficients;

4. The required calculating operations for calculating the color values are limited to multiplications and additions which can be simply implemented with known hardware circuits in real time and with great precision;

5. An exact calibration of each and every spectral channel is possible given reference to a reference white $\beta(\lambda)=1$ or $\tau(\lambda)=1$, whereby the spectral sensitivity distributions of the sensors, the spectral radiation distribution of the illuminating light source, as well as the spectral properties of the optical channels can be exactly taken into consideration. For example, the spectral variations of the light source arising due to aging are also covered;

6. Given employment of planar sensors and one additional reference white measurement per spectral channel before every measurement in the corresponding channel, location-dependent differences, for example the sensitivity distribution of the sensor or inhomogeneities in the illumination of the original, can be corrected in context in addition to the spectral differences;

7. Further, the multispectral method of the invention also contributes to improving the signal-to-noise ratio of the color analysis since every color value is acquired from the summation of at least 16 individual images, whereby every channel can optimally fully utilize the modulation range of the sensor.

The scanning of an image according to the multispectral method of the invention must occur in three steps per channel;

1. scanning the reference image white and depositing the white values for every pixel in an image store;

2. scanning the image and multiplication of the image values by the reciprocals of the white values stored for every pixel, overwriting the white values with the corrected measured values;

3. calculation of the color values by multiplication by the channel-associated coefficients, for example of the standard spectral value curves and of the light source, as well as subsequent accumulation of the values in three color value image stores.

It is a critical advantage of the invention that it can be applied to all known image scanning methods such as, for example, drum scanners, CCD line sensors and CCD planar sensors. The embodiment of the invention having three accumulating stores also enables the realization of color image pickup systems that differ only insignificantly from the expense of the three range method.

BRIEF DESCRIPTION OF THE DRAWINGS

FIG. 16 is a block diagram primarily of a calculation and accumulator unit according to the invention connected to a white value calibration unit according to the invention.

DESCRIPTION OF THE PREFERRED EMBODIMENTS

The invention shall be discussed for two exemplary embodiments with reference to FIGS. 12 through 16. The invention can be fundamentally applied to known image scanning systems such as drum scanners, CCD line scanners and semiconductor planar sensors. The exemplary embodiments, however, are based on an image pickup system having a two-dimensional planar sensor, since this will have primary significance in the future. The employment of the planar sensor also has the advantage that the color original can be scanned as often as desired without any mechanical displacement of the pixels relative to the image sensor, and thus an error-free coincidence of the spectral separation images is obtained. Analogously, the exemplary embodiments are likewise applicable to the other systems.

Figure 1:
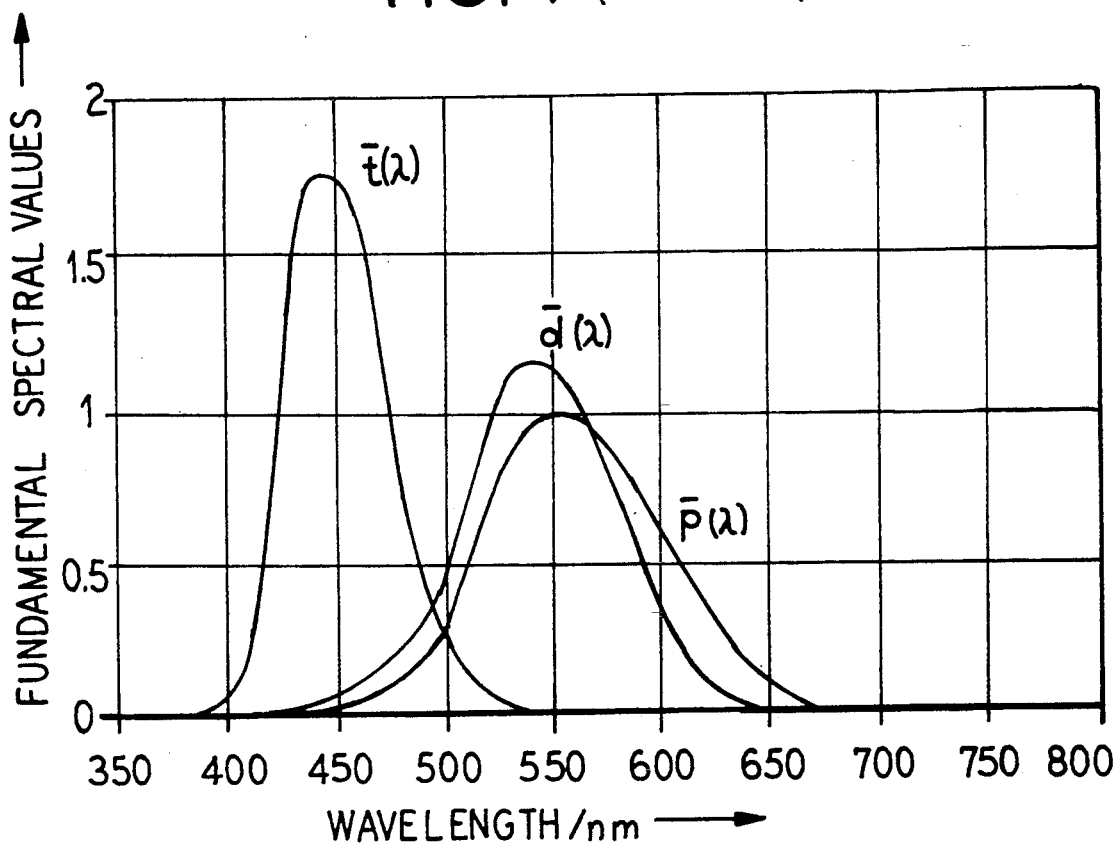
FIG. 1 is a graph showing three fundamental spectra value curves according to the prior art.
Figure 2:
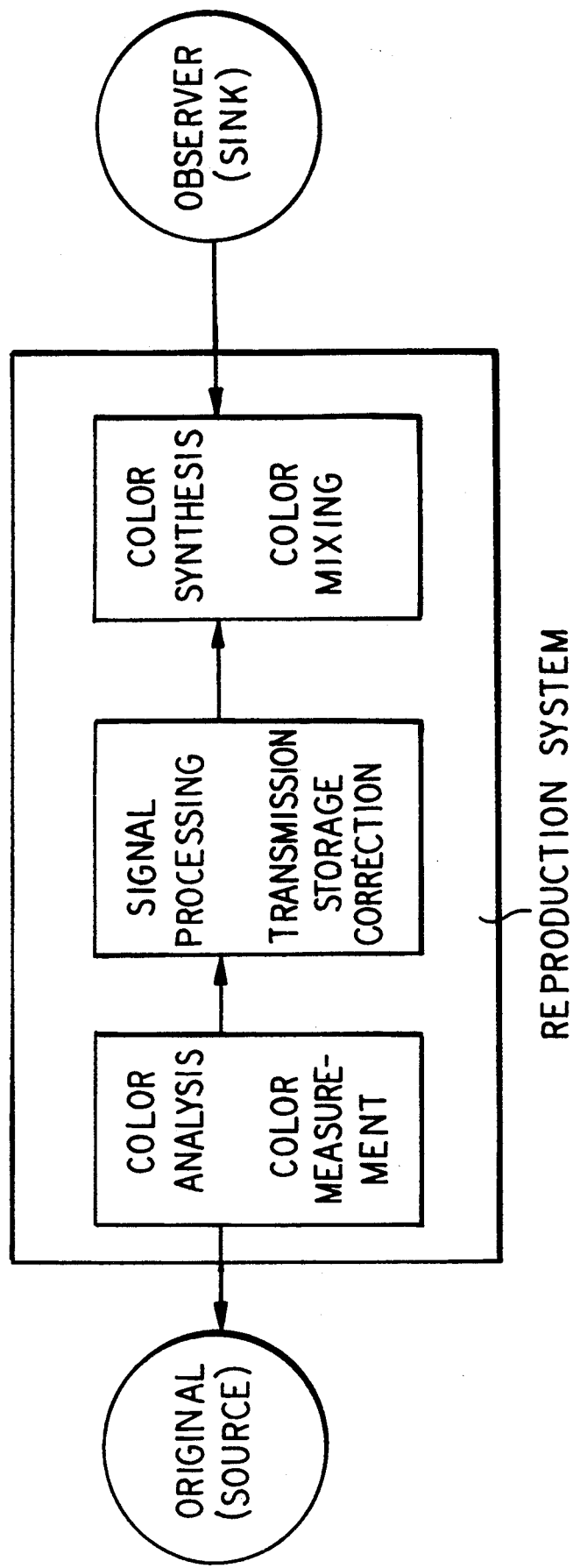
FIG. 2 is a block diagram of a prior art reproduction system.
Figure 3:
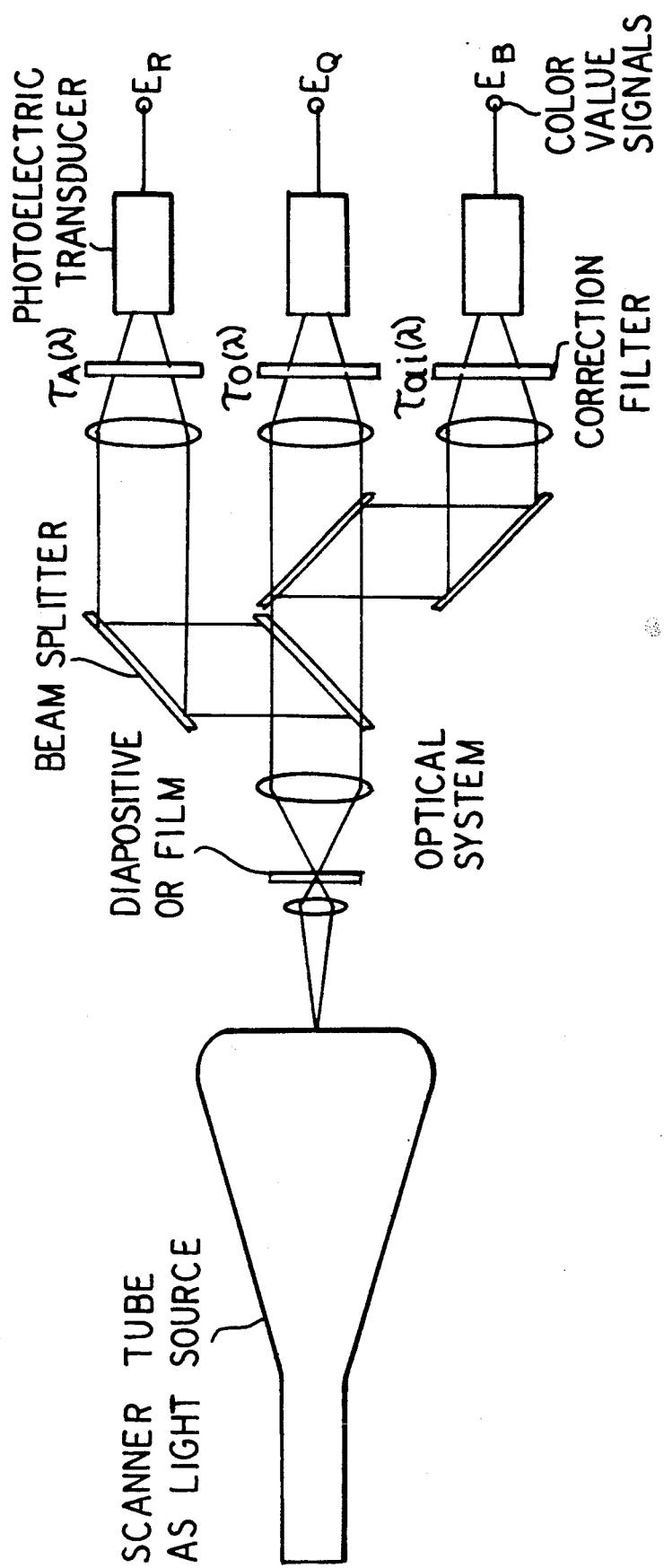
FIG. 3 is an illustration of a prior art flying spot scanner system.
Figure 4:
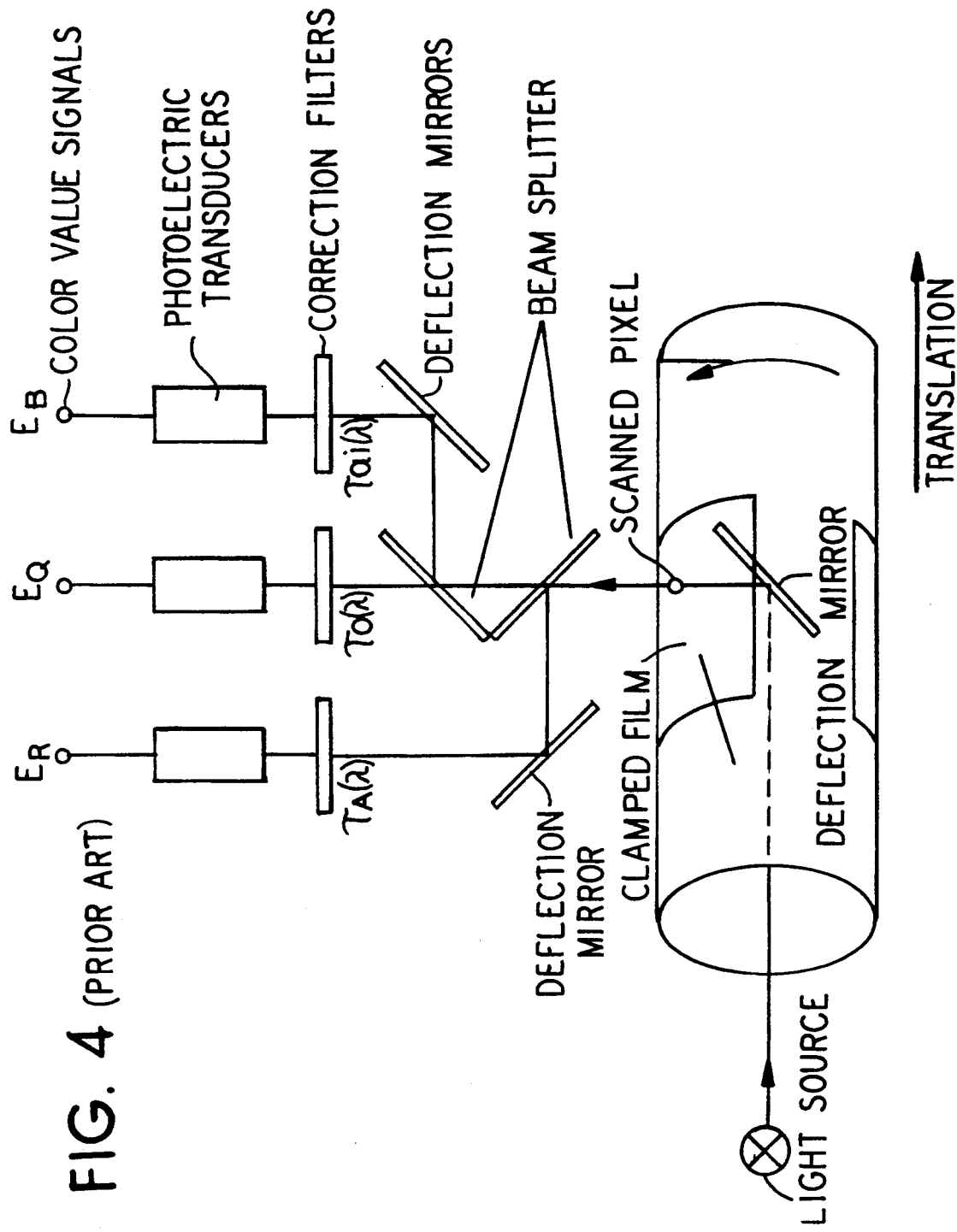
FIG. 4 is a diagram of a prior art drum scanner.
Figure 5:
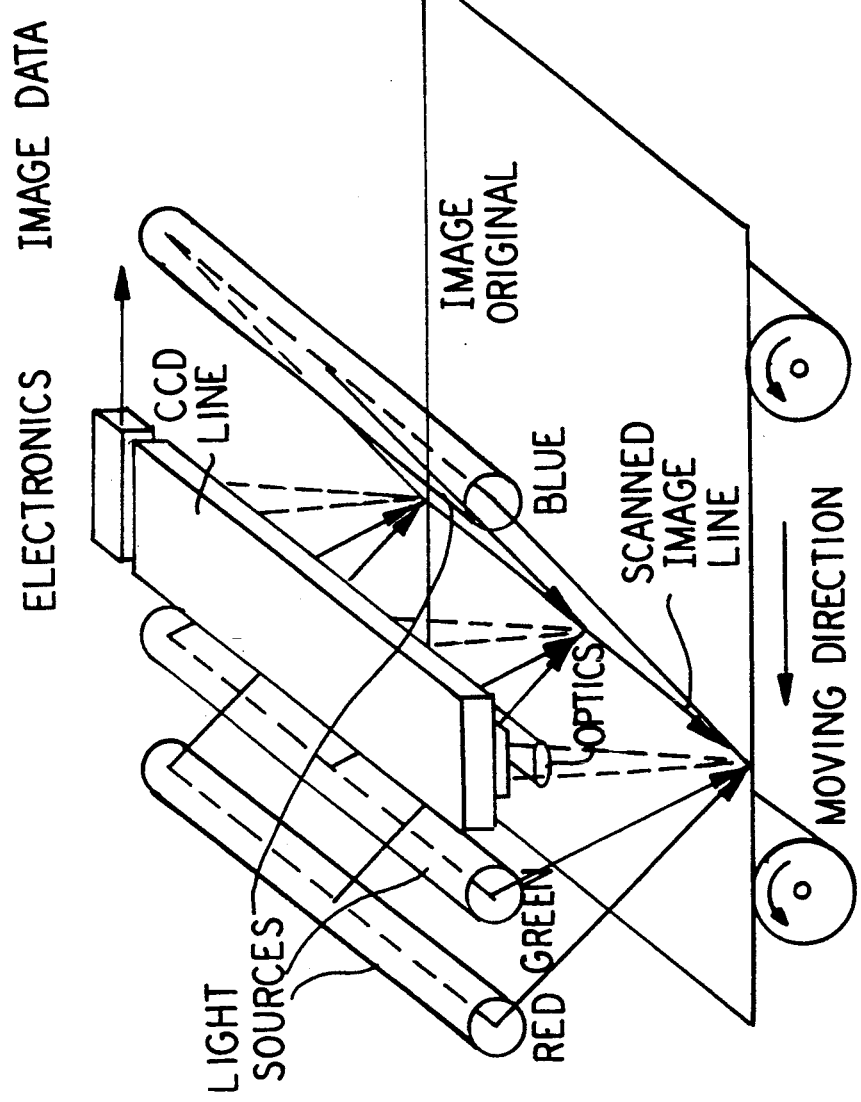
FIG. 5 is a perspective illustration of a CCD prior art flatbed scanner.
Figure 6:
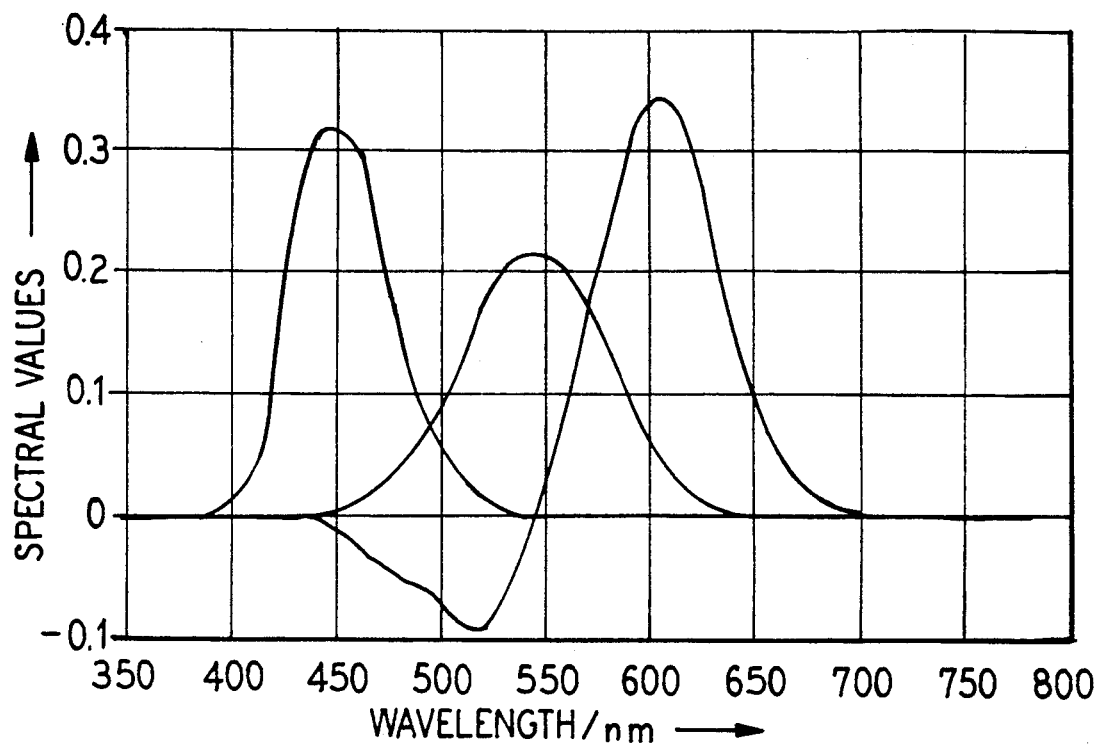
FIG. 6 is a graph showing spectral value curves for spectral reference stimuli according to the prior art.
Figure 7:
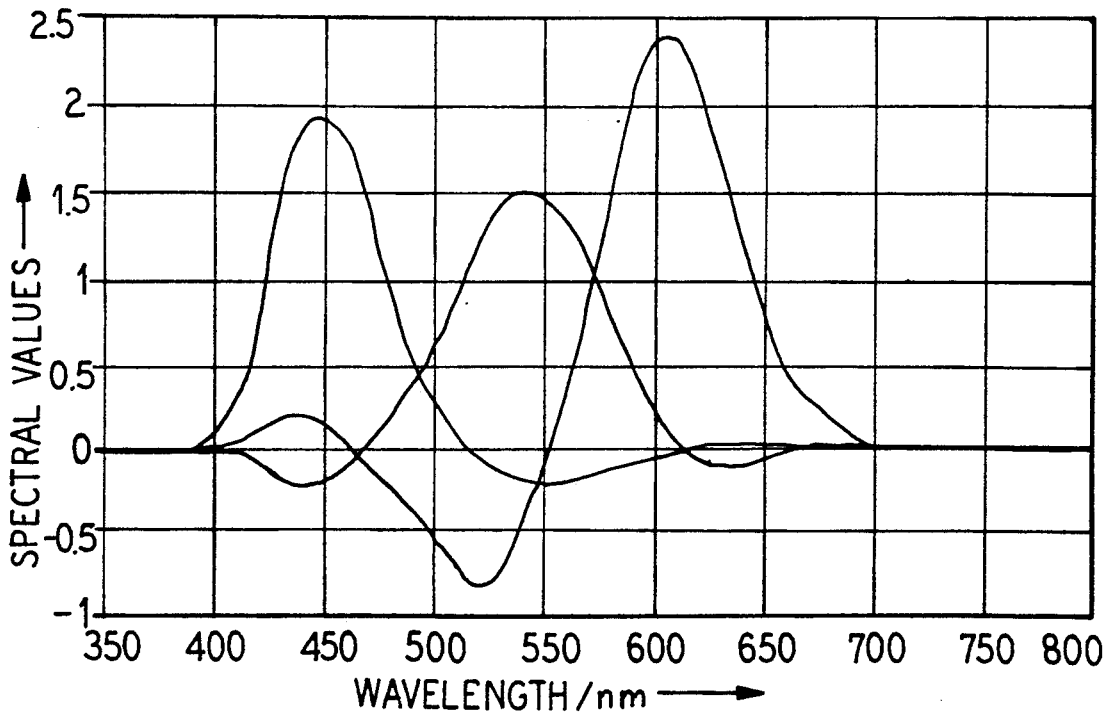
FIG. 7 is a graph according to the prior art showing spectral value curves for EBU primary colors.
Figure 8:
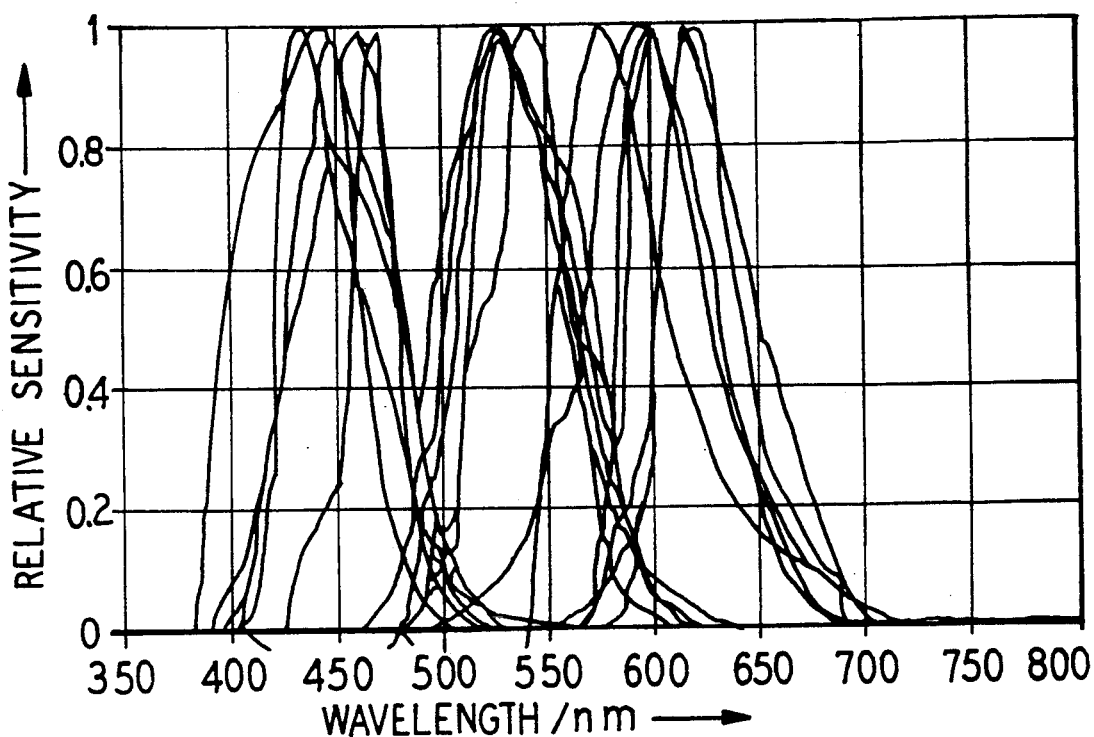
FIG. 8 is a graph showing spectral sensitivities of various film scanners of the prior art.
Figure 9:
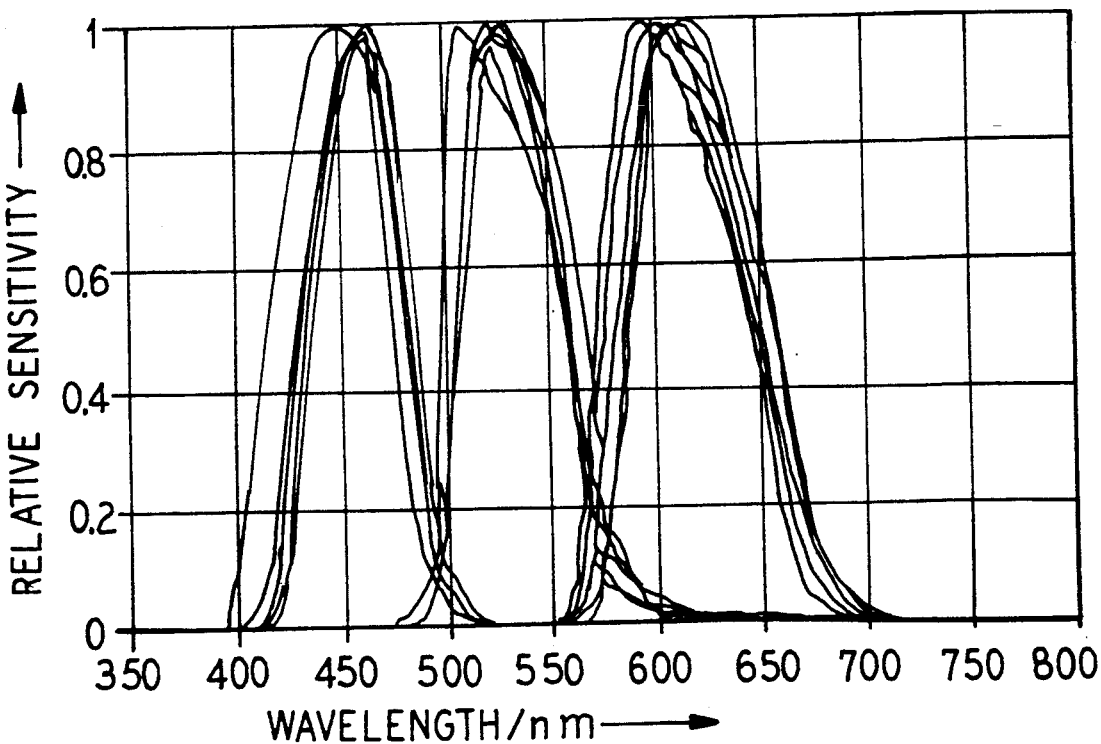
FIG. 9 is a graph showing spectral sensitivities of various prior art drum scanners.
Figure 10:
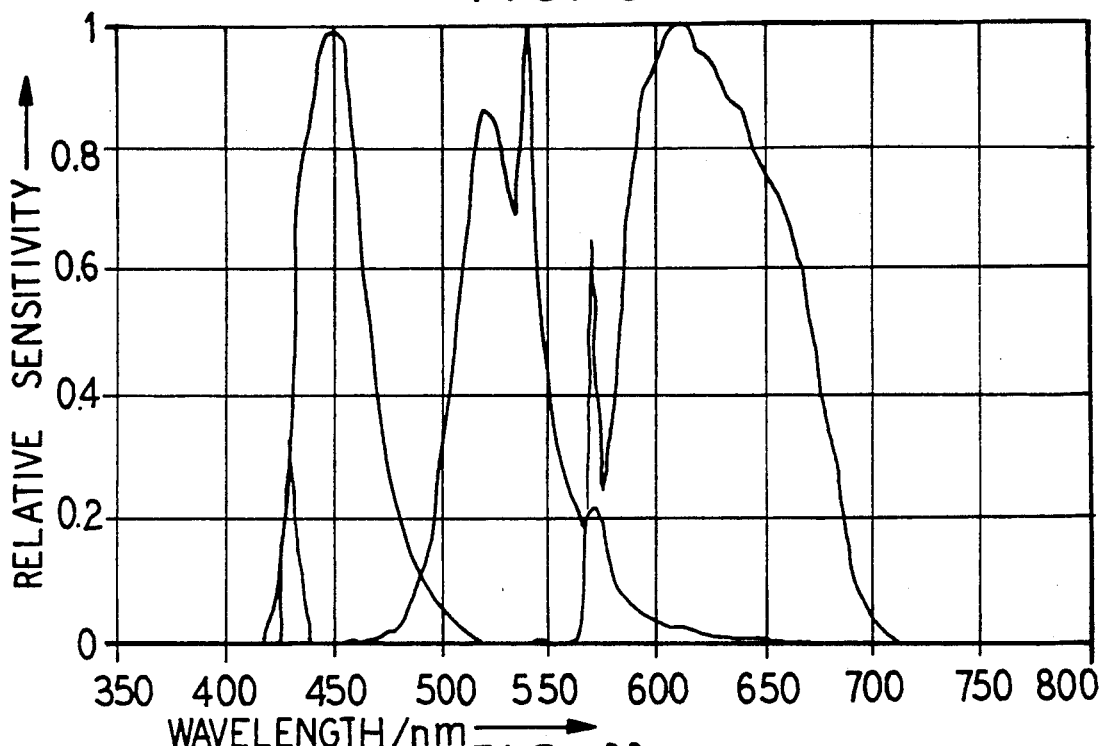
FIG. 10 is a graph showing spectral sensitivity curves of a DTP flatbed scanner according to the prior art.
Figure 11:
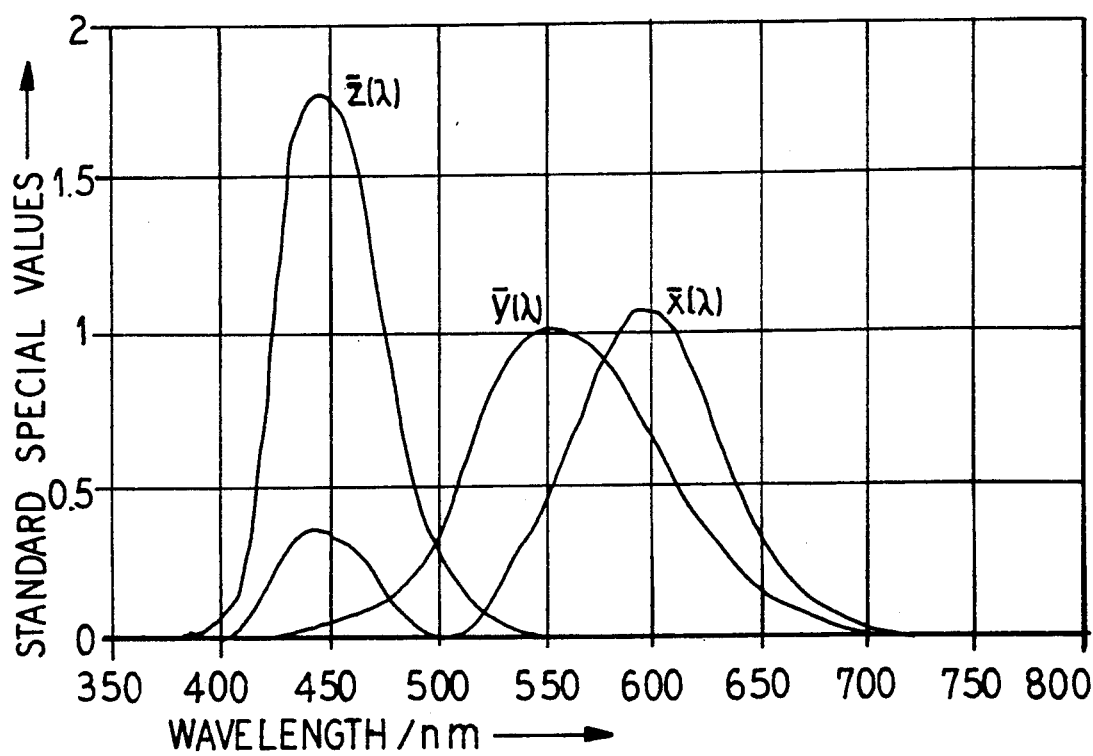
FIG. 11 is a graph showing standard spectral value curves according to DIN 5033 according to the prior art.
Figure 12:
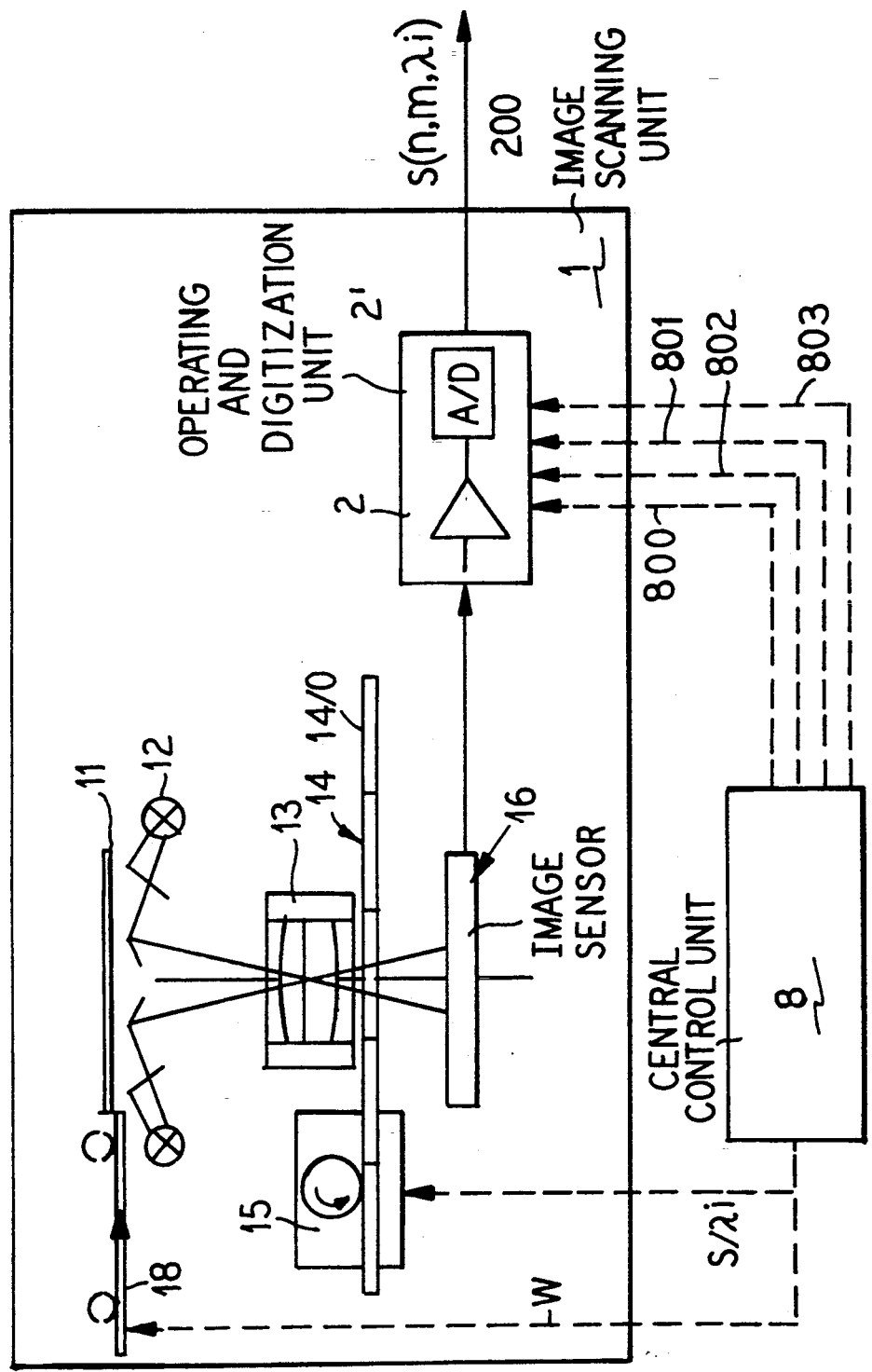
FIG. 12 is a block diagram of a color image pickup system according to the invention.
Figure 13:
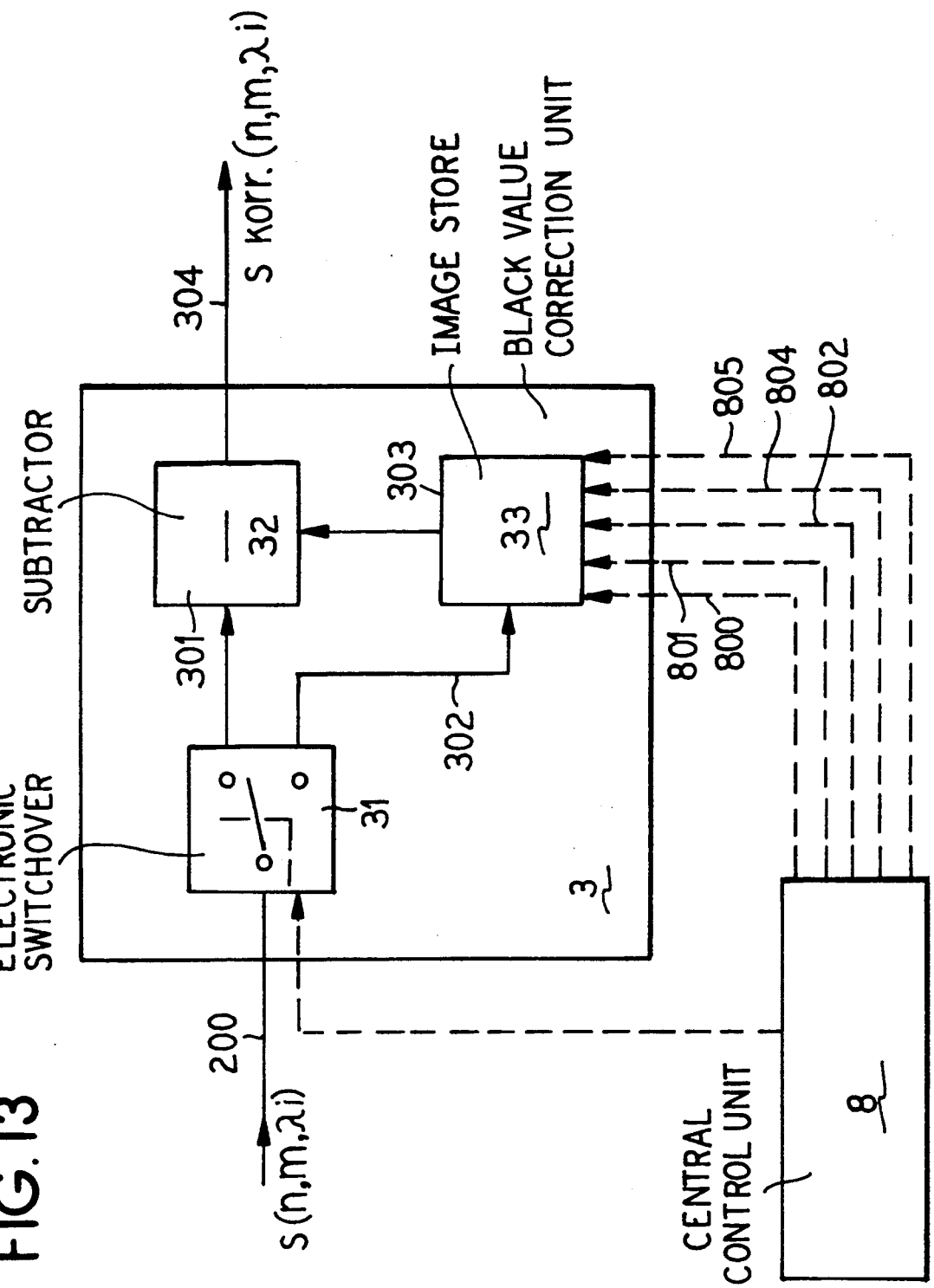
FIG. 13 is a block diagram of a black value correction arrangement according to the invention.
Figure 14:
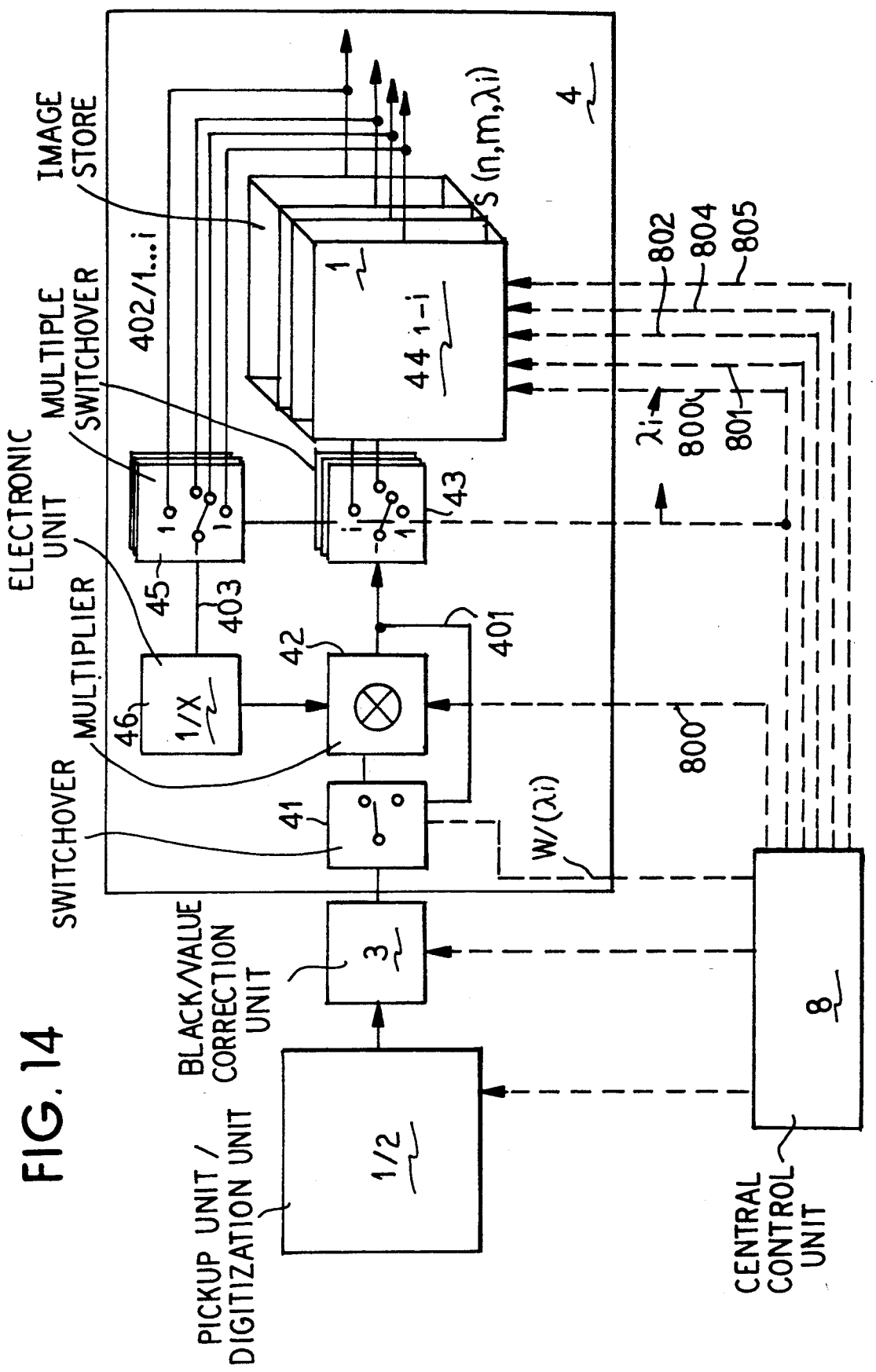
FIG. 14 is a block diagram of a complete multi-spectral pickup unit according to the invention.
Figure 15:
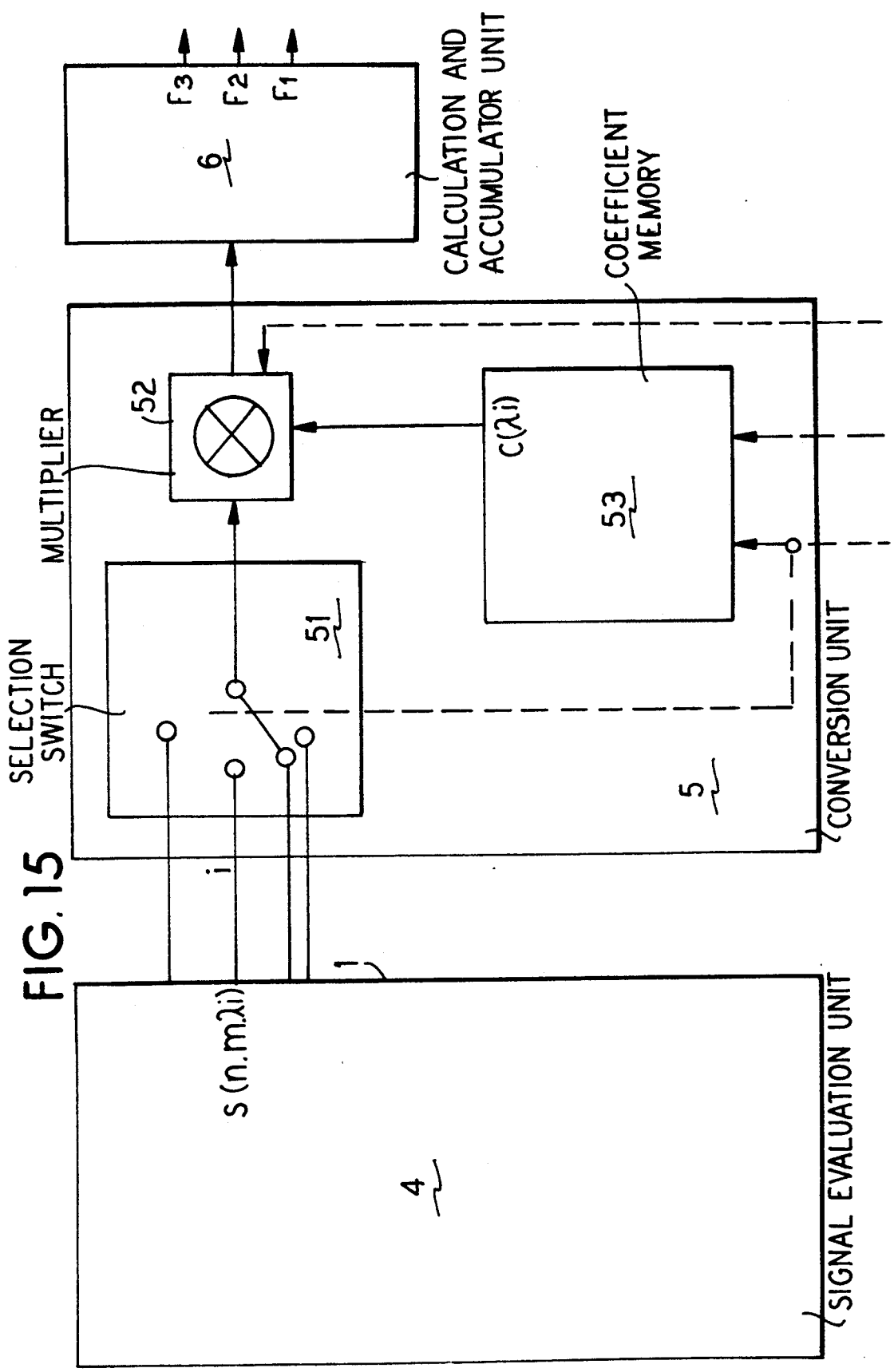
FIG. 15 is a block diagram of a signal evaluation unit, conversion unit, and calculation and accumulator unit according to the invention.

The exemplary embodiments are resolved into the image scanning unit 1 in FIG. 12 comprising an operating and digitization electronics 2, a black value correction unit 3 in FIG. 13, a first evaluation unit for the pickup of I spectral images of a color image having calibration to a white image original in FIG. 14, a second evaluation unit 5 for the spectral conversion and matching of the spectral images to various types of reproduction illumination in FIG. 15, and a third evaluation unit in FIG. 16 having a calibration unit 4" and a color computer unit 6 with three image stores and accumulator devices for forming three independent color signals from the narrow-band spectral separation images.

FIG. 12 first shows the common image scanning unit 1 having operating and digitization unit 2. The color image original 11 to be scanned is illuminated with the broadband light source 12 and is imaged onto a two-dimensional semiconductor image sensor 16 via an imaging lens 13. A means 14 having I narrow-band spectral filters, a black filter and a stepping means is inserted into the optical beam path. One window 14/0—the black window—of the means 14 is black and serves the purpose of blocking the beam path. The image sensor 16 contains n image rows and m columns and is connected to an operating electronics having an analog-to-digital converter 2' wherein the image signals are edited, digitized and serially output row-by-row for the pixels (n, m). For that purpose, the clock signals via the clock line 800, a reset signal 801, the addresses via 802 and pickup/read out signals via 803 are supplied by a central control unit 8. The control unit also generates the signals via the selection line S/$\lambda_i$ needed for switching the stepping unit, whereby the beam path is blocked (0 position=S) for the registration of a black image for calibration purposes and the individual, narrow-band filters are introduced into the optical beam path for various spectral separations with $1 \leq i \leq I$. I thereby denotes the plurality of narrow-band spectral separations. Furthermore, for calibrating the system, a white image original 18 can be inserted over the color image original, this being initiated by the central control unit with the selection line W. The output signal of the pickup unit S(n, m, $\lambda_i$) output via the output line 200 is subsequently further-processed in an evaluation electronics according to the exemplary embodiment.

Dependent on the type of image sensor employed, it can become necessary to implement a black value correction. Residual charges frequently arise in the individual memory elements of the image sensor, particularly given CCD image sensors, these leading to a point-associated, electronic "offset". An arrangement 3 for black value correction of the CCD sensor is therefore shown in FIG. 13. This contains an electronic switchover means 31 (realized, for example, by a 1:2 demultiplexer), a subtractor 32, and an image store 303 for storing n×m black values 33 for all n×m pixels of the planar sensor 16.

At the beginning of a black value correction pickup, the memory 33 is set to 0 in all memory elements by the central control unit 8 via the reset line 802. Subsequently, the pickup unit 1 registers a black image with blocked optical beam path (position 14/0 of the filter set). The signals of the black image are supplied via the line 200 to the black value correction unit 3 and are read into the image store 33 via the switch 31 and the line 302. For that purpose, the image store receives the necessary addresses, the write signal, and the write-/read selection signal via the lines 800, 802, 804 and 805. Subsequently, the switch 31 is switched via the selection line S/$\lambda_i$ from the position S (equals black value pickup) into the position for picking up spectral separations, and the memory 33 is switched to read operation (line 805 for write/read selection). Corresponding to the pixel addresses n, m (line 802) that are set, black values are then subtracted via the subtractor 32 from all signals that then flow to the black value correction unit 3 via the line 200.

The black value correction unit can be loaded once at the beginning of an image pickup or can be loaded anew before every spectral separation as needed, when this is required due to time-dependent properties of the image sensor. For minimizing the expense, the image store 33 need not be designed, for instance, for a spectral image store since the black value errors yield only relatively small signals. The memory depth can be selected correspondingly small.

FIG. 14 shows an exemplary embodiment of a complete multispectral pickup unit that outputs the color information in I spectral components at the output. It is composed of the pickup unit 1 with operating and digitization unit 2, the black value correction unit 3 (optional) and a signal evaluation unit 4 which is calibrated to a white image original, as well as the central control unit 8 for generating all necessary clock, address and control signals. This unit shall not be discussed in greater detail since the generation of the necessary clock and control signals as well as generation of the addresses are a matter of course and are known to a person skilled in the art.

The evaluation unit 4 contains a switchover means 41, a multiplier 42, a multiple switchover 43 (realized, for example, as a 1:I demultiplexer), a semiconductor image store 44 having I parallel levels for respectively n×m pixels corresponding to the resolution of the image sensor 16 in the scan unit, a further multiple switchover 45 (realized, for example, as a I:1 multiplex) and an electronic unit 46 (1/×unit) that converts supplied numerical values into their reciprocal numerical values. The switch 43 serves the purpose of the selection of I levels of the image store 44. Alternatively, the level selection can also occur in a known way via the write selection of individual semiconductor memories. The 1/×unit 46 can be most simply constructed by a permanent program table (look-up table) for all possibly occurring numerical values.

For a complete color image pickup and correction of all error influences, I spectral separations of the color image 11 must be registered for respectively I spectral channels and, for the complete correction of all errors cited under the object of the invention 3a) through d), another I spectral separations of a white image original 18 as a calibration original must be registered. Dependent on the sensor employed, additionally a black image correction is needed. The black image correction is therefore implemented first in the way already set forth above.

The pickup of spectral separations is undertaken such that respectively one spectral filter 14/i is inserted and a complete image pickup is implemented for all pixels n×m. The pixel signals are then, for example, read sequentially from the image sensor row-by-row and they are then stored by selection via the switch 43 in the memory level i of the image store 44. This procedure is repeated for all I spectral separations.

The image signals acquired in this way, however, would only imprecisely represent the color image information due to the errors in the sensitivities of the individual picture elements of a semiconductor sensor, due to illumination and errors of the optics, etc., cited under the object of the invention. One therefore first begins with the pickup of I spectral separations of a structureless reference white image original 18 as a calibration original. The multiplier 42 in the evaluation unit 4 is thereby bridged by the position W of the selection switch 41, and the white image spectral separations are thus directly deposited in the memory 44. Subsequently, the white image original 18 is removed from the beam path of the scanner unit 1 and the color image original is released. The I spectral images of the color image original 11 are then successively registered by inserting the appropriate spectral filters 14 and are sequentially supplied to the evaluation unit 4. The switch 41 of the evaluation unit 4 is now switched into the position ($\lambda_i$) and the pixel signals pass through the multiplier 42, where they are multiplied by the reciprocal pixel values of the white image original and are thereby calibrated to a maximum value of 1. For every pixel n, m addressed at the moment in the image store 44, the white value corresponding thereto is read out from the memory 44 of the spectral channel $\lambda_i$, is processed, and is supplied to the unit 46 via the multiple switch 45, its reciprocal value being formed therein. This is then supplied to the multiplier. The result of the multiplication is subsequently deposited in the image store 44 again under the same address.

The picture element signals obtained and stored in this way are completely individually corrected for every pixel of the planar sensor as an individual channel.

A further development of the invention comprising the following conversion unit 5 of FIG. 15 serves the purpose of converting the spectral separation values to different types of reproduction light for a following transmission to a reproduction system. As already mentioned before, this possibility is only possible with the multispectral method of the invention and it opens up a considerably improved matching to different color reproduction conditions.

The conversion unit 5 is shown here by way of example for a sequential readout of the data from the image store 44. For that purpose, the unit contains a selection switch 5$i$ (multiplexer), a multiplier 52 and a coefficient memory, for example in the form of a permanently programmed table 53. The individual spectral images from the memory 44 in the evaluation unit 4 are selected with the selection switch and the pixel data are sequentially read out. The data thereby pass through the multiplier 52, where they are converted with the coefficients $c(\lambda_i)$. The coefficients $c(\lambda_i)$ thereby correct, for example, the spectral distribution in the spectral range of an illumination source used in the later color image reproduction.

The arrangement shown here for sequential readout of the pixel information, of course, could also be executed in parallel with I parallel multipliers for all spectral levels. Given what is, however, an increased expense, a faster output of the image information would then be enabled.

When an output of the color signals in three independent color values is desirable, a conversion of the spectral values into three independent color values can be implemented with the assistance of a further evaluation unit, of the color computer, and of the accumulator unit 6. This can follow or without involvement of the conversion unit 5. Its function shall be set forth below, together with the second exemplary embodiment, wherein it is likewise employed.

The described color image pickup system generates a plurality of samples S(n, m, li) distributed over the spectral range for every pixel n, m. As a result of a linear transformation with the coefficients $a_{ki}$, this plurality of I samples can be transformed into three independent color value components F1 through F3 on the basis of colormetrics. For example, RGB signals according to the EBU standard, or the XYZ norm signals for the following transformation into a perception-matched color space such as, for example, the lab space according to the CieLab standard, can thus be formed. The linear transformation into three independent color components has the form:

$$F_1(n.m) = a_{1,1}S(n.m.\lambda_1) + a_{1,2}S(n.m.\lambda_2) + \ldots + a_{1,1}S(n.m.\lambda_{1,})$$

$$F_2(n.m) = a_{2,1}S(n.m.\lambda_1) + a_{2,2}S(n.m.\lambda_2) + \ldots + a_{2,1}S(n.m.\lambda_{1,})$$

$$F_3(n.m) = a_{3,1}S(n.m.\lambda_1) + a_{3,2}S(n.m.\lambda_2) + \ldots + a_{3,1}S(n.m.\lambda_{1,})$$

The calculation and accumulator unit 6 of FIG. 16 implements this linear transformation in a "hardware" circuit. In the exemplary embodiment 6, the coefficients $a_{k,i}$ are made available in three tables of the table memory 64 operated in parallel. Three respective coefficients having the same index i are read out via the selection line $\lambda_i$ and are supplied to the three multipliers 61 operated in parallel. These have the data word of a pixel $S(n,m,\lambda_i)$ offered in parallel at their second inputs and multiply the latter with the coefficient. For the first spectral separation having the index 1, the three values thus obtained that correspond to the three values of the first column from the above equation system are stored in parallel in the three levels of the image stores 63 after this had been completely set to 0 at the beginning. One correspondingly proceeds for all pixels of the first spectral separation. For the next spectral separation, the coefficients from the tables 64 are correspondingly switched and new values are thus formed pixel-by-pixel at the output of the multiplier 61. simultaneously, the data previously already stored for every pixel are then again read out from the memory 63 via the lines 601 through 603 and are added via the three adders 62 to the newly formed values at the outputs of the multipliers. The arrangement of the memory 63 with the adder 62 thus forms an accumulator unit for the individual lines of the above equation system. After the registration of all spectral separations of a color image, the three color signals can then be calculated by real-time accumulation and are stored in the three memory levels of the memory 63.

It is advantageous to design the coefficient memory 64 in the conversion unit such that a plurality of coefficient sets can be formed for the formation of different, independent color values such as, for example, optionally RGB or XYZ values. These can be selected with the selection line 810.

In the exemplary embodiment of FIG. 16, this calculation and accumulator unit 6 is used for the real-time accumulation of three independent color signals during the registration of the spectral separations. It enables an embodiment having lower expense for image stores and thus enables a realization of the multispectral method without substantial added expense compared to the known three range method. In addition, a white value calibration unit 4* is thereby introduced. Since I memory levels are no longer provided here for the individual spectral pickups of a white image calibration, the white original 18 must be inserted in the scan unit 1 before every new pickup of a spectral separation of the color image 11. Consequently, a white image separation pickup is made first, given the same position of the selected spectral filter 14 and a color image separation pickup is then made. The signals of the white image separation are deposited in an image store having n×m memory locations in the unit 4" given the position of the selection switch 41* in position W. In the following pickup of the spectral separation for the color image, these calibration values are then in turn read out pixel-by-pixel and are used for the division of the incoming color image separation values (switch 41* in position $\lambda_i$). This occurs via the formation of a reciprocal value in the unit 45* and via the multiplier 42*.

Dependent on the structure of the narrow-band spectral filters 14 employed in the pickup unit 1, an error that has not yet been taken into consideration can arise in that the spectral transmission curves of the filters change with the angle of the transmitted light beam. Such an error typically occurs, for example, given interference filters and effects a shift of the center frequency and a modification of the spectral bandwidth. The mean values of the wavelength of the transmission curves important for the calculation of the coefficients $a_{k,i}$ in the coefficient memory can then vary slowly with the location of a pixel from the center of the image toward the edge. Modified mean wavelengths must then have modified coefficients allocated to them in order to implement a colorimetrically correct conversion into independent color components F1 through F3. In the exemplary embodiment of the unit 6 in FIG. 16, it is thereby provided to correspondingly adapt the conversion coefficients with a plurality of reference points uniformly distributed over the image area (for example, in fields of respectively $16 \times 16$ pixels averaged). For that purpose, the coefficient memory 64 has the same number of memory levels as reference points which were selected, i.e., for example, $(m \times n)/Z$ given n rows, m columns and averaged referenced points over respectively Z pixels. The reference point addresses can be employed as addresses for switching the coefficient sets simply by shortening the pixel addresses by a selected number of the least significant places. This is indicated in FIG. 16 by the additional selection line 802* with supply of abbreviated pixel addresses.

Modern CCD image sensors together with the inventive structure of the realtime memory correction and evaluation units enable a high speed for the registration of every spectral channel. Typically, $1000 \times 1000$ pixels can currently be scanned, corrected and stored in fractions of a second. With automated mechanisms for changing the spectral filters or a white image original, only a time of approximately 1 to 2 minutes is required for 32 +1 pickups according to the exemplary embodiment, this still lying below the scanner and color image pickup systems with drum or line scanners.

Although various minor changes and modifications might be proposed by those skilled in the art, it will be understood that we wish to include within the claims of the patent warranted hereon all such changes and modifications as reasonably come within our contribution to the art.

We claim as our invention:

1. A color image pickup system, comprising:
    an image scanner means for scanning a color image original and having an optoelectronic detector for generating digital pixel signals;
    said image scanner means having an electronic editing and digitization means for acquiring said digital pixel signals and for outputting digital pixel signals;
    an electronic evaluation means connected to an output of said editing and digitization means for providing black value and white value correction to said digital pixel signals, said electronic evaluation means having an electronic image store;
    said image scanner means having a black filter and a plurality I where I>3 of narrow-band spectral filters having means wavelengths distributed over an entire visible spectral range, means for introducing said spectral filters and said filter into an optical beam path between said color image originals and said optoelectronic detector, and means for substituting for said color image original a structureless white image original;
    said image scanner means acquiring digital pixel signals corresponding to a black image pickup, I spectral separations having spectral samples of the color image original distributed over the entire visible spectral range, and I spectral separations having samples of the white image original distributed over the entire visible spectral range for n × m pixels of the color image original; and
    said electronic evaluation means forming for all n × m pixels calibrated spectral samples from the black image pickup, I spectral separations having spectral samples of the color original, and I spectral separations having samples of the white image original.

2. A system according to claim 1 including means for storing said calibrated spectral samples in I memory levels.

3. A system according to claim 1 including means for deriving three independent color value signals from said calibrated spectral samples after evaluation with specific coefficients by accumulation in three image memory levels per pixel, and means for storing said three independent color value signals.

4. A system according to claim 1 wherein said image scanner means comprises a drum scanner.

5. A system according to claim 1 wherein said image scanner means comprises a CCD line scanner.

6. A system according to claim 1 wherein said image scanner means comprises a semiconductor planar sensor.

7. A system according to claim 1 wherein said means for substituting covers over said color image original with said white image original.

8. A system according to claim 1 wherein said electronic evaluation means includes an image store means with I parallel and selectively writeable and readable memory levels for storage of said I spectral separations; a digital multiplier, and an electronic means for forming reciprocal values of pixel information that have been read out; means for registering, given a bridge multiplier, I spectral separations of the white image original and storing them; means for dividing pixel information of the I spectral separations by values of the white image original in turn read out from the memory and overwritten in the image store means; and means for registering the I spectral separations of the color image original.

9. A system according to claim 8 including a further electronic evaluation means comprising a multiplier and coefficient memory connected to an output of said image store means memory levels, said further electronic evaluation means comprising means for conversion of spectral values to specific reproduction reference light sources and weighting the spectral values with defined coefficients upon read out of the spectral separations from the memory levels of the image store means; and the coefficient memory having a plurality of selectable memory level means for storing coefficients sets for different reference light sources.

10. A system according to claim 1 wherein said electronic evaluation means contains a white value calibration means having a white value image store level and an electronic means for division of spectral pixel signals of a color original with values read out from the white value image store level; means for registering a spectral separation of the white image original for every spectral pickup of the color image original; means for calibrating by division subsequently registered spectral separations of the color image original for each of the n×m pixels; further evaluation means for multiplying the calibrating spectral values with specific coefficients from a coefficient memory in real time in three parallel channels; and means for accumulating these values in three parallel image store levels in order to thus form three independent color value signals.

11. A system according to claim 10 wherein said three independent color value signals comprise RGB signals.

12. A system according to claim 10 wherein said three independent color value signals comprise XYZ signals.

13. A system according to claim 10 wherein said coefficient memory in said further evaluation means contains levels with different coefficient sets; means for switching the different coefficient sets by abbreviated pixel addresses; and means for correcting shifts of the spectral position of the samples dependent on the location of the color image original.

* * * * *